United States Patent [19]

Reh

[11] 4,214,809
[45] Jul. 29, 1980

[54] FIBER OPTIC PENETRATOR

[75] Inventor: Oswald R. Reh, Bonita, Calif.

[73] Assignee: International Telephone and Telegraph Corporation, New York, N.Y.

[21] Appl. No.: 926,514

[22] Filed: Jul. 20, 1978

[51] Int. Cl.³ .............................................. G02B 5/14
[52] U.S. Cl. ................................. 350/96.20; 174/70 S
[58] Field of Search ............... 350/96.15, 96.20, 96.21, 350/96.22, 96.23; 174/70 R, 70 S

[56] References Cited

U.S. PATENT DOCUMENTS

| 2,155,650 | 4/1939 | Gilbert | 174/70 S |
|---|---|---|---|
| 2,697,739 | 12/1954 | Presswell | 174/70 S |
| 2,838,596 | 6/1958 | Foord | 174/70 S X |
| 2,938,067 | 5/1960 | Werner | 174/70 S |
| 3,456,838 | 7/1969 | Chapman et al. | 174/70 S X |
| 3,825,320 | 7/1974 | Redfern | 350/96.22 |
| 4,090,778 | 5/1978 | Phillips et al. | 350/96.20 |
| 4,158,477 | 6/1979 | Phillips et al. | 350/96.21 |

FOREIGN PATENT DOCUMENTS

| 629999 | 10/1949 | United Kingdom . | |
| 744934 | 2/1956 | United Kingdom . | |
| 1479575 | 7/1977 | United Kingdom | 350/96.21 |

Primary Examiner—John K. Corbin
Assistant Examiner—John D. Lee
Attorney, Agent, or Firm—William T. O'Neil

[57] ABSTRACT

A fluid-type penetrator or feed-through device particularly adapted for conveying an optical fiber in a fiber optic signaling arrangement through an interface wall separating environments of greatly different physical (especially pressure) and/or chemical properties.

A clearance passage considerably larger than the optic fiber is bored through the bulkhead separating the two different environments, and a guidance sleeve having a central axial bore only slightly clearing the diameter of the optic fiber is inserted therein. Pressure plugs also containing axial clearance bores are provided at high and low pressure sides of the arrangement, the low pressure plug being inserted by means of screw threads. The high pressure plug on a corresponding side of the bulkhead is automatically forced into tighter engagement in the counterbore into which it is inserted. Both pressure plugs include sapphire orifice members which have the characteristic of providing very small clearance for inserted optic fibers. All clearances are sealed and bonded using a bubble-free, somewhat resilient bonding agent.

5 Claims, 1 Drawing Figure

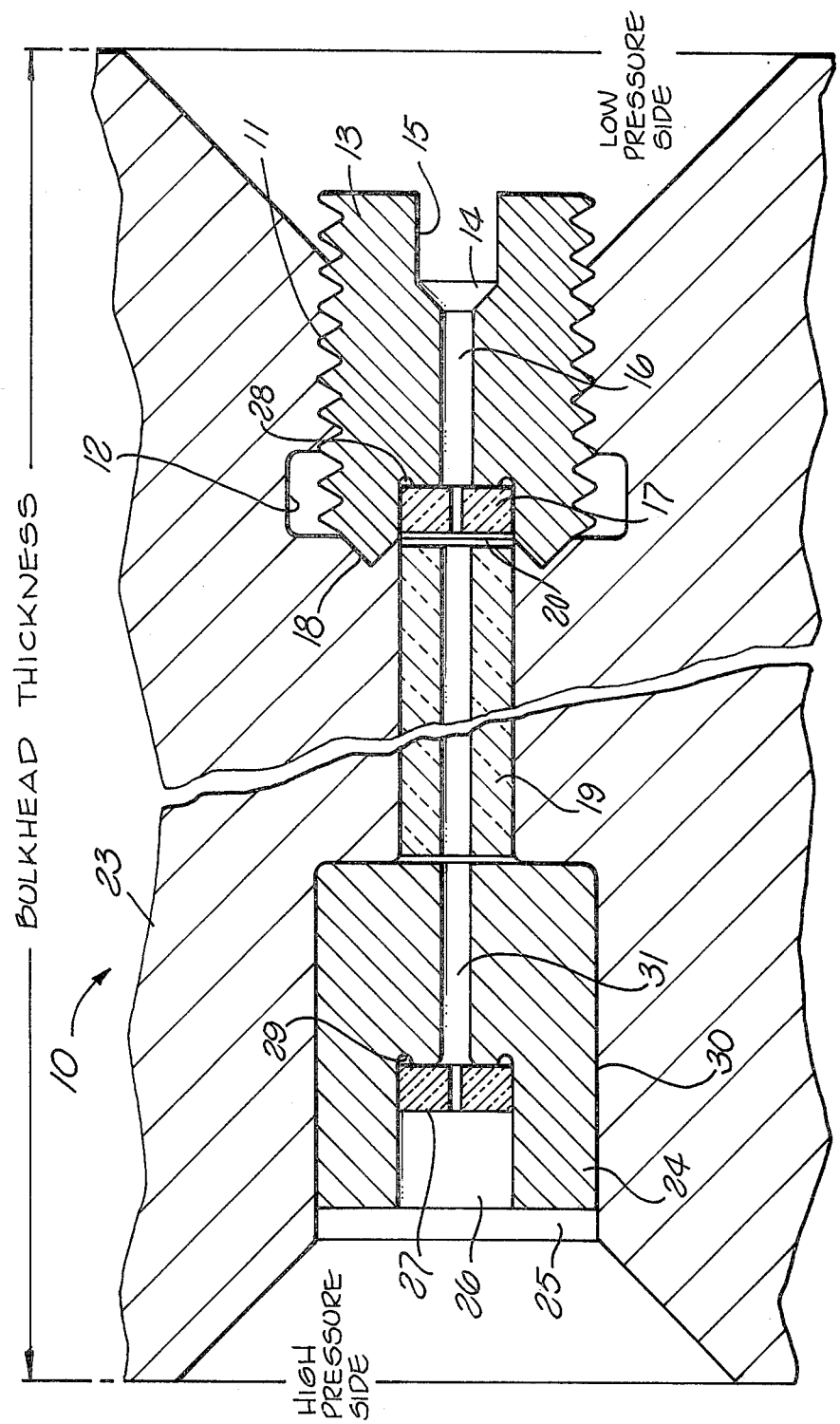

FIBER OPTIC PENETRATOR

BACKGROUND OF THE INVENTION

1. Field of the Invention

The invention relates to penetrators for effecting signal communication tasks through a bulkhead or barrier separating greatly different physical and/or chemical environments and more particularly to penetrators for conveying optical fibers of fiber optic signaling systems therethrough.

2. Description of the Prior Art

The prior art in respect to optical fiber penetrators is very limited in view of the fact that fiber optic signalling systems, especially of the submarine type, are relatively new. Penetrators (sealed feed-thru devices) are known, however, for electric signalling systems, including submarine cable systems. Such feed-thru arrangements are shown, for example, in U.S. Pat. Nos. 2,155,650; 2,697,739; and 3,456,838.

The manner in which the invention provides for penetration of a chamber or vessel, such as a repeater housing, in submarine signalling systems of the fiber optic type, will be evident as this description proceeds.

SUMMARY

In optic fiber systems, the requirements for a penetrator are, in some respects, more severe than for electric systems using metallic conductors and, in other respects, less severe, since the optic fibers are not subject to corrosion or shorting by conductive sea water. Fiber optic penetrators preferably should not involve interruption of the light path by interface structures, since these are inevitably, at least somewhat, lossy. In electric systems, however, connectors per se do not ordinarily produce significant losses. Thus, a well-sealed electrically conductive member can be brought through a bulkhead in ceramic or glass insulation, for example, and connections made thereto on either side of the bulkhead member with substantially no signal loss.

According to the invention, an optic fiber is conveyed through a bulkhead member separating two environments of different physical and/or chemical characteristics in a sealed manner. Thus, a high hydrostatic pressure extant at one bulkhead face, as in the case of a housing for a submarine repeater or the like, must be resisted to prevent sea water intrusion into the housing. The continuous optic fiber is conveyed through at least one jewel orifice member, the latter being sealed to the housing and to the fiber itself by an adhesive sealant. The jewel, preferably a synthetic sapphire, is capable of maintaining a smooth bore substantially free of surface distortion and of the small diameter accommodating the optic fiber with very small clearance as well as a distortion-free outer surface. The sealant is therefore required to seal only the very small volumes between jewel and optic fiber and between jewel and housing bulkhead structurally related members. Two jewels adjacent inner and outer bulkhead faces are preferred, the jewel at the low-pressure side being backed by a structural part related to the bulkhead to keep it seated. The intervening bulkhead thickness, which may be substantial for submarine applications, is provided with a drawn glass sleeve or guide between jewels for prevention of optic cable buckling due to thrust forces.

The details of a typical form of the invention will be evident as this description proceeds.

BRIEF DESCRIPTION OF THE DRAWING

A single FIGURE is presented which is an axial sectioned view of a typical penetrator assembly, especially for use with optical fiber passing through a bulkhead according to the invention.

DETAILED DESCRIPTION

Referring now to the FIGURE, the sectioned area 23 will be understood to be a bulkhead member separating one physical or chemical environment from another. The physical environment difference includes a relatively large pressure differential in the submarine cable application, especially since submarine cable systems are frequently deployed where the ocean floor may be thousands of feet below the surface. In such applications, bulkhead member 23 may be the end plate of a repeater housing or enclosure, for example.

In the FIGURE, the left side as viewed is the high-pressure side, and the right side is the low-pressure side. In view of the great fluid pressures exerted by sea water at ocean floor depths where submarine cable systems are commonly deployed, the bulkhead thickness would be expected to be substantial, and the material of the bulkhead member 23 would be selected in accordance with design considerations. Stainless steel and titanium are among the suitable metals from which the bulkhead 23 might typically be fabricated for a submarine cable system repeater enclosure.

Materials of the same type as employed for bulkhead member 23 may also be considered suitable for the high-pressure end plug 24 and the low-pressure end plug 13.

In the illustrated example, a guide sleeve 19 fits into a first bore of diameter only slightly greater than its own outside diameter. The purpose of sleeve 19 is to be able to protect the optical fiber as it passes therethrough, and for that purpose, the sleeve 19 must be fabricated from a material that does not exhibit significant surface distortion. A quartz glass material fabricated into the tubular shape by drawing and manufactured to the indicated length provides an insert substantially devoid of surface distortion in its axial passage 21. Moreover, the inside diameter through passage 21 is relatively uniform over the length of part 19.

Elements 27 and 17 are of particular importance in the construction of a penetrator according to the invention. These elements are jewel orifice members, preferably of synthetic sapphire. That particular material is known for its hardness and the fact that a bore or orifice therethrough can be obtained, by conventional methods long known in the watchmaking industry, which is substantially free of surface irregularities, burrs and other variations which might damage an optical fiber inserted therethrough. Moreover, the characteristics of the sapphire member permit the minimizing of the clearance provided between the outside diameter of the optic fiber running therethrough and the jewel orifice itself, a fact greatly reducing the load borne by the sealant subsequently applied.

It will be noted that the jewel member 27 is mounted in a bore 26 axially recessed into the plug 24, thereby mounting it with the orifice of 27 coaxial with the passages through the entire assembly (i.e., 31, 21, etc.). Since the left end of the FIGURE represents the high-pressure side of the bulkhead and penetrator assembly, it will be understood that the hydrostatic force (of sea water, for example) from the left tends to urge the jewel member 27 against the bottom of bore 26, hence there is no tendency for it to be dislodged by that pressure.

An annular groove 29 around the bottom of bore 26 serves as a receptacle for excess quantities of adhesive sealant, the application of which will be described hereinafter, and also for extraneous particles resulting from manufacture and assembly. These particles may be very small, and in that connection, it should be pointed out that the drawing is much magnified for clarity, typical actual optic fiber diameters encountered being only a few thousandths of an inch. The jewel orifice members 27 and 17 are therefore, correspondingly very small as compared to the magnified illustration in the drawing.

From the foregoing, it will be realized that the hydrostatic pressure operates to produce a thrust force from left to right on the FIGURE, and this force is resisted by the compression extant between 27 and the bottom of the bore 26 and between plug 24 and the bottom of the bore into which it is inserted in the bulkhead 23. These parts may be referred to as the first line of defense of the penetrator.

The aforementioned thrust force obviously acts in the opposite sense in respect to plug 13 and the parts associated therewith. That is, plug 13 would thereby tend to be expelled from the bore in which it is installed. For that reason, a threaded engagement at 11 is provided, comprising external threads on the plug 13 and internal threads in the bore into which it is installed in bulkhead 23. The chamber 12 which is a circumferential groove provides thread relief and also a space into which particles resulting from the manufacturing operation may be contained without a hazard of their causing voids or impediments to a tightly fit overall assembly.

A screw driver slot 15 for use in assembly is shown at the outer end of plug 13 and in view of the fact that even the most carefully constructed threads are not as tightly engaged as are surfaces in a sliding press-fit, for example, a circumferential ridge 18 is provided which engages a corresponding groove in 23, providing additional surface into which the adhesive sealant may be effective and also providing more precise alignment of jewel orifice member 17 with respect to passages 16 and 21 than would otherwise be possible.

It will be noted that a circumferential groove 28 is provided in connection with jewel orifice member 17 into the material of plug 13, this serving the same purpose as 29 in respect to plug 24. At 20, the inward edge of the plug 13 appears approximately centered between the inward face of jewel orifice member 17 and the right face of the quartz glass sleeve 19. Accordingly, there is no compression transmission between the glass sleeve 19 and jewel orifice member 17 or, for that matter, between plug 24 and 19.

Once the assembly has been effected in accordance with the foregoing description, an optical fiber which is essentially a continuous part of a fiber optic cable system may be inserted, normally from the high pressure side, through the orifice in 27, the passages 31, 21, the orifice in 17, and 16, emerging in the chamfered portion 14 of plug 13. In the submarine cable application, this would be the normal direction from which the fiber optic cable would be inserted. It will be realized, however, that if the penetrator is to be used to bridge between atmospheric or other nominal gas pressure on the high pressure side and the airless environment of outer space on the right, the optical fiber may be inserted from the right side, or low pressure side, as viewed in the FIGURE.

It may be observed that the jewel orifice member 17 constitutes a second line of defense against sea water penetration in the submarine cable application. The entire assembly is preferably effected, using a somewhat resilient bubble-free adhesive sealant or cementing material. Such a cementing material should preferably have a shore factor of approximately 30, this being an elasticity figure of merit consistent with long-life of the assembly and resistance to at least several cycles of pressurization and depressurization over the life of the unit. Such cycles are encountered, for example, in the original deployment of a submarine cable system, its retrieval or repairs, and subsequent redeployment. Such adhesive sealants or cementing materials are applied in a highly fluid form and permitted to cure thereafter. Accordingly, they are adapted for wetting of all the inside surfaces and interfaces of the assembly through capillary action and/or vacuum impregnation. Those processes and the adhesive sealant itself are conventional and known to those with skill in the art. No critical relationships are involved in the selection of the adhesive sealant, the ordinary skill of this art being sufficient for an engineering judgment in that regard.

As hereinbefore indicated, materials exposed to the high-pressure (or for that matter, to low-pressure) environment across the bulkhead member may be selected in accordance with conventional engineering judgments, considering also the strenght requirements. One further consideration applied in respect to potential for electrolytic corrosion where the penetrator, according to the present invention, is used in an assembly where electric currents are also passed through conductive strength members or armors of fiber optic cables which form a part of the system. Those electric currents supplied are frequently necessary (such as, for example, when the bulkhead 23 is part of the housing of a sealed repeater chamber or the like) for a submarine fiber optic cable system. Conventional engineering knowledge and judgment is required in the selection of materials. Optic fiber cables themselves are now well known and their application in signaling systems is becoming commonplace. In addition to submarine cable applications, the invention will be recognized as useful in aerospace realm and in well operation and control for underwater habitats and many other areas where signaling systems must penetrate the enclosures or barriers separating greatly different environments with respect to pressure, chemical activity, etc.

Variations and modifications on the specific structure illustrated and described are obviously possible within the spirit and scope of the invention. Accordingly, it is not intended that the drawing or this description should be regarded as limiting the scope of the invention, those being intended to be typical and illustrative only.

What is claimed is:

1. A penetrator assembly, particularly for conveyance of an optical fiber in a fiber optic signaling arrangement across a large pressure differential, comprising:
   a bulkhead member across which said pressure differential is extant between relatively high and relatively low pressure first and second surfaces thereof, respectively;
   a first bore through said bulkhead of at least sufficient diameter to permit passage of a selected optic fiber axially therethrough;
   first and second counterbores coaxial with said first bore but of larger diameter, each of said counterbores extending to a depth which is less than half of the thickness of said bulkhead member in the axial dimension of said bore and counterbores;

first and second pressure plugs installed in said first and second counterbores, respectively, said pressure plugs each including an optic fiber clearance axial bore coaxial with said first bore and said counterbores;

first and second jewel orifice members mounted within said first and second pressure plugs, respectively, said jewel orifice members each having a bore coaxial with said pressure plug clearance bores, a through passage being established within said penetrator assembly such that said optical fiber may be conveyed without interruption through said passage; said jewel member bores providing a closer tolerance fit against said optical fiber than provided in any other part;

and an adhesive sealant applied at least to the fit tolerance surface between said jewel orifice members and said optical fiber to provide a fluid-tight bond.

2. Apparatus according to claim 1 in which said jewel members are further defined as synthetic sapphire jewels.

3. Apparatus according to claim 1 in which said adhesive sealant is applied to and extant between all internal surface interfaces of the parts of said penetrator assembly.

4. Apparatus according to claim 1 in which said first counterbore forms a shoulder within the thickness of said bulkhead member, said first pressure plug bearing on said shoulder as a result of said differential pressure and said first jewel member bearing similarly within a second counterbore from the exterior end of said first plug.

5. Apparatus according to claim 4 in which said second plug is externally threaded and said second bulkhead counterbore is internally threaded over at least a portion of its axial depth, said second plug being threaded into said internal threads, said second jewel member being held within a cavity at the internal end of said second plug to resist axial pressure effective against said second plug and jewel member adjacent said low pressure surface of said bulkhead member.

* * * * *